United States Patent
Russo et al.

(10) Patent No.: US 8,953,808 B2
(45) Date of Patent: *Feb. 10, 2015

(54) SYSTEM AND METHOD FOR EFFECTIVELY PERFORMING DATA RESTORE/MIGRATION PROCEDURES

(75) Inventors: Christopher Russo, San Diego, CA (US); Grant Sabesky, Lakeside, CA (US); Darion Felix Rodgers, Escondido, CA (US); Glenda McFerran, Oceanside, CA (US); Carolyn A. Lynch, San Marcos, CA (US); Justin Kauffman, Carlsbad, CA (US); Robert Cowie, Escondido, CA (US); Fredrik Carpio, San Diego, CA (US); Nikolaos Georgis, San Diego, CA (US); Jonathan Hood, San Marcos, CA (US)

(73) Assignees: Sony Corporation, Tokyo (JP); Sony Electronics Inc., Park Ridge, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 13/442,067

(22) Filed: Apr. 9, 2012

(65) Prior Publication Data
US 2012/0195432 A1    Aug. 2, 2012

Related U.S. Application Data

(63) Continuation of application No. 12/290,086, filed on Oct. 27, 2008, now Pat. No. 8,189,794.

(60) Provisional application No. 61/126,634, filed on May 5, 2008, provisional application No. 61/130,903, filed on Jun. 4, 2008.

(51) Int. Cl.
*H04L 9/08* (2006.01)
*G06F 21/62* (2013.01)

(Continued)

(52) U.S. Cl.
CPC ........ *G06F 21/6272* (2013.01); *G06Q 30/0641* (2013.01); *G06F 11/1464* (2013.01); *G06F 11/1469* (2013.01)
USPC .............. 380/286; 380/277; 707/637; 726/26

(58) Field of Classification Search
USPC .......... 380/286; 713/168–174, 182–186, 202; 709/225, 229; 726/2–8
See application file for complete search history.

(56) References Cited

U.S. PATENT DOCUMENTS 6,760,708 B1 * 7/2004 Hubbard et al. ............. 705/26.5
2002/0114461 A1 * 8/2002 Shimada et al. ............. 380/201

(Continued)

FOREIGN PATENT DOCUMENTS

JP    H09-160832    6/1997
WO    WO 2007/016787 A2    2/2007

OTHER PUBLICATIONS

Eji Okamoto, Introduction of an Encryption Theory, Kyoritsu Publishing Company, Feb. 25, 1993, pp. 110-112.

*Primary Examiner* — Evans Desrosiers
(74) *Attorney, Agent, or Firm* — Gregory J. Koerner; Redwood Patent Law

(57) ABSTRACT

A system and method for effectively supporting data transfer procedures includes a source device that registers with an account server to participate in a data backup service. The source device then encrypts and stores user data onto a datacenter. The source device later may request a data transfer task from a vendor. The datacenter responsively transfers the encrypted user data to a vendor server, and an escrow server generates and sends a temporary key to the vendor server. A destination device may then utilize the temporary key to decrypt and securely store the user data onto the destination device.

16 Claims, 11 Drawing Sheets

(51) Int. Cl.
  *G06Q 30/06* (2012.01)
  *H04L 9/00* (2006.01)
  *G06F 17/00* (2006.01)
  *G06F 7/00* (2006.01)
  *G06F 17/30* (2006.01)
  *G06F 7/04* (2006.01)
  *G06F 11/14* (2006.01)

(56) References Cited

U.S. PATENT DOCUMENTS

| | | | |
|---|---|---|---|
| 2004/0187012 A1 | 9/2004 | Kohiyama et al. | |
| 2006/0005048 A1* | 1/2006 | Osaki et al. | 713/193 |
| 2006/0193474 A1* | 8/2006 | Fransdonk | 380/279 |
| 2006/0282901 A1* | 12/2006 | Li et al. | 726/26 |
| 2007/0027812 A1* | 2/2007 | Ogawa et al. | 705/57 |

* cited by examiner

SYSTEM AND METHOD FOR EFFECTIVELY PERFORMING DATA RESTORE/MIGRATION PROCEDURES

This Application claims priority in U.S. Provisional Patent Application No. 61/126,634 entitled "Data Restore And Migration For Service And Factory (Apollo)" that was filed on May 5, 2008, and in U.S. Provisional Patent Application No. 61/130,903 entitled "Data Restore And Migration For Service And Factory (Apollo)" that was filed on Jun. 4, 2008, and also, as a Continuation Application, in U.S. patent application Ser. No. 12/290,086 entitled "System And Method For Effectively Performing Data Restore/Migration Procedures" that was filed on Oct. 27, 2008 now U.S. Pat. No. 8,189,794. The foregoing related Applications are commonly assigned, and are hereby incorporated by reference.

BACKGROUND SECTION

1. Field of the Invention

This invention relates generally to techniques for managing electronic information, and relates more particularly to a system and method for effectively performing data restore/migration procedures.

2. Description of the Background Art

Implementing effective methods for managing electronic data is a significant consideration for designers and manufacturers of contemporary electronic devices. However, effectively managing electronic data utilized by electronic devices may create substantial challenges for system designers. For example, enhanced demands for increased device functionality and performance may require more system processing power and require additional software resources. An increase in processing or software requirements may also result in a corresponding detrimental economic impact due to increased production costs and operational inefficiencies.

Furthermore, enhanced device capability to perform various advanced data management operations may provide additional benefits to a system user, but may also place increased demands on the control and management of various system components. For example, an electronic device that effectively stores electronic data may benefit from an effective implementation because of the large amount and complexity of the digital data involved. In addition, protecting the integrity and security of confidential electronic data is often an important factor.

Due to growing demands on system resources, substantially increasing data magnitudes, and data security considerations, it is apparent that developing new techniques for managing electronic data for electronic devices is a matter of concern for related electronic technologies. Therefore, for all the foregoing reasons, developing effective techniques for managing electronic data remains a significant consideration for designers, manufacturers, and users of contemporary electronic devices.

SUMMARY

In accordance with the present invention, a system and method for effectively performing data restore/migration procedures is disclosed. In one embodiment, a source device initially creates a user account with an account server to participate in a data backup service. The account server notifies an escrow server regarding the new user account of the source device. In response, the escrow server sends a permanent key to the source device so that a device user of the source device can decrypt user data backups if so desired. The account server notifies a datacenter regarding the new user account of the source device. The source device may then encrypt user data, and remotely store the encrypted user data as a backup copy onto the datacenter.

In certain circumstances, the source device may require a vendor to perform a data restore/migration task. The source device may therefore contact a customer support center of the vendor to obtain a work order for performing the restore/migration task. The source device typically sends a task request and the foregoing work order to the account server. The account server responsively sends the received word order to an escrow server and the datacenter.

The escrow server then encrypts a unique temporary key, and transmits the temporary key and the received work order to a vendor server of the vendor. In addition, the datacenter transfers the received work order and corresponding encrypted user data to the vendor server. A destination device also sends a copy of the work order corresponding to the source device's data restore/migration task to the vendor server. The vendor server responsively sends the temporary key and the encrypted user data to the destination device. The destination device may then decrypt the temporary key, and utilize the temporary key to decrypt and store the user data onto the destination device.

The destination device may then transmit a task-complete message to the vendor server, and the vendor server may responsively delete the temporary key and the user data corresponding to the current data restore/migration procedure. For at least the foregoing reasons, the present invention therefore provides an improved system and method for effectively performing data restore/migration procedures.

DETAILED DESCRIPTION

The present invention relates to an improvement in electronic data management techniques. The following description is presented to enable one of ordinary skill in the art to make and use the invention, and is provided in the context of a patent application and its requirements. Various modifications to the disclosed embodiments will be readily apparent to those skilled in the art, and the generic principles herein may be applied to other embodiments. Therefore, the present invention is not intended to be limited to the embodiments shown, but is to be accorded the widest scope consistent with the principles and features described herein.

The present invention comprises a system and method for effectively supporting data transfer procedures, and includes a source device that registers with an account server to participate in a data backup service. The source device then encrypts and stores user data onto a datacenter. The source device later may request a data transfer task from a vendor. The datacenter responsively transfers the encrypted user data to a vendor server, and an escrow server generates and sends a temporary key to the vendor server. A destination device may then utilize the temporary key to decrypt and securely store the user data onto the destination device.

Figure 1:
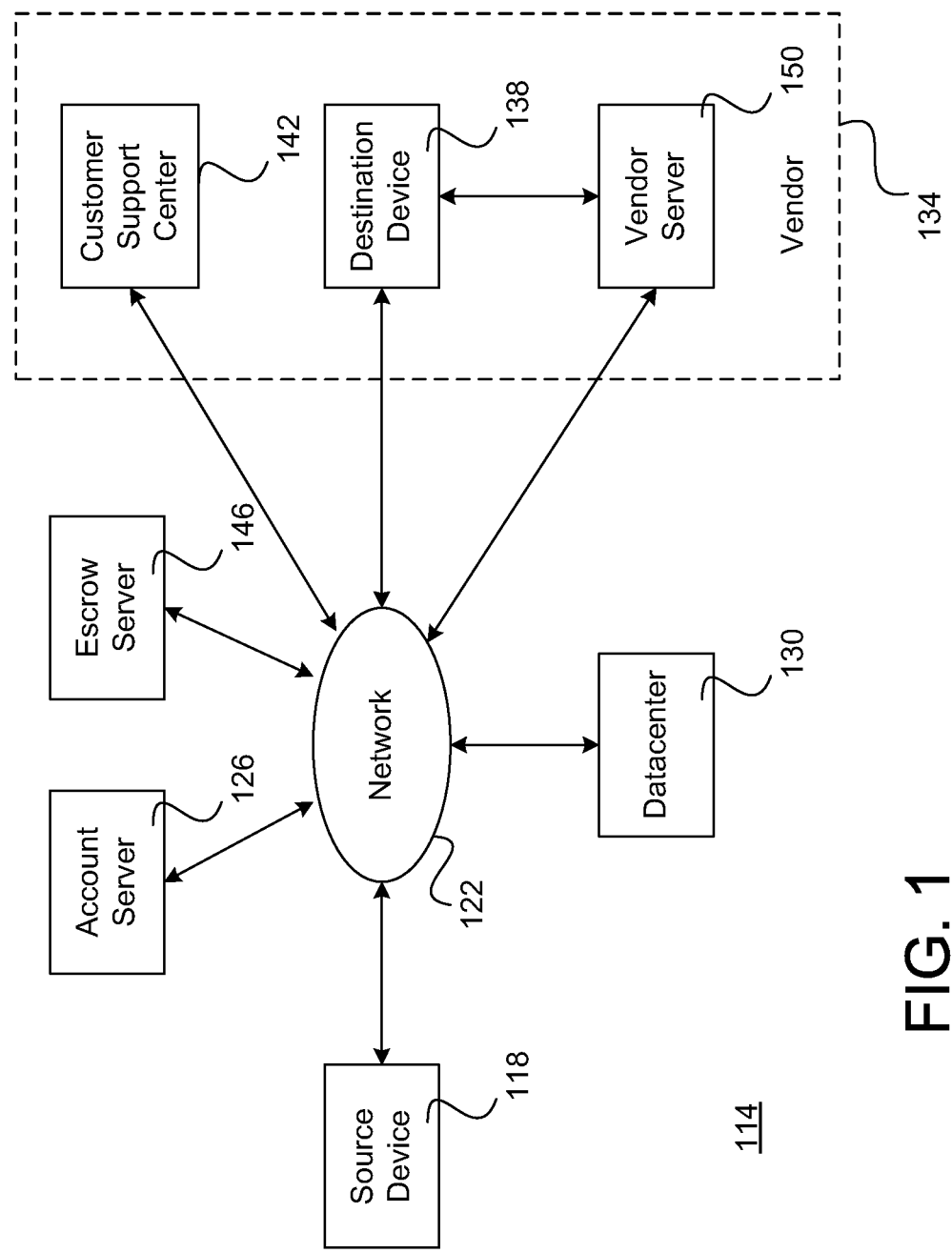
FIG. 1 is a block diagram of a data restore/migration system, in accordance with one embodiment of the present invention.

Referring now to FIG. 1, a block diagram of a data restore/migration system 114 is shown, in accordance with one embodiment of the present invention. In the FIG. 1 embodiment, data restore/migration system 114 may include, but is not limited to, a source device 118, an account server 126, a datacenter 130, a destination device 138, a customer support center 142, an escrow server 146, and a vendor server 150. In alternate embodiments, data restore/migration system 114 may be implemented by utilizing components and configurations in addition to, or instead of, certain of those components and configurations discussed in conjunction with the FIG. 1 embodiment.

The present invention provides improved techniques for allowing a vendor 134 to either migrate or restore user data from source device 118 to destination device 138 in a secure and confidential manner. In a data migration scenario, vendor 134 may be a manufacturer or seller of a destination device 138. A device user may wish to replace source device 118 with a new destination device 138, and therefore compensates vendor 134 for migrating existing user data from the old source device 118 to the new destination device 138 in a secure and confidential manner.

In a data restore scenario, vendor 134 may provide technical service and support for a source device 118 that typically is experiencing a technical problem. For example, source device 118 may have a defective hard drive that requires replacement. In the data restore scenario, destination device 138 therefore represents the original source device 118 after various appropriate repairs have been completed. The original user data from source device 118 may then need to be restored onto the repaired destination device 138. A device user may thus compensate vendor 134 for restoring the original user data from the source device 118 to the repaired destination device 138 in a secure and confidential manner.

In the FIG. 1 embodiment, utilizing vendor 134 to perform data restore/migration procedures provides an enhanced level of convenience for a device user. However, the confidential nature of the user data must be preserved, since vendor 134 directly handles the user data during such data restore/migration procedures. In the FIG. 1 embodiment, customer support center 142 and vendor server 150 are typically controlled and operated by vendor 134. However, to enhance data security, account server 126 and datacenter 130 may be controlled and operated by a separate backup service, and escrow server 146 may be controlled and operated by a separate escrow service.

In the FIG. 1 embodiment, communications typically occur by means of a network 122 (including, but not limited to, the Internet). However, communications between vendor server 150 and destination device 138 preferably occur over a high-speed communication link to expedite transfers of large amounts of user data. In the FIG. 1 embodiment, source device 118 initially creates a data backup account with account server 126, encrypts the user data, and remotely stores the encrypted user data on datacenter 130. When source device 118 requires a data restore/migration procedure, then source device 118 may obtain a corresponding work order from customer support center 142 of vendor 134.

Source device 118 may then disseminate the work order to account server 126, datacenter 130, and escrow server 146 in any effective manner. In response, escrow server 146 encodes and transmits a unique temporary key to vendor server 150. In addition, datacenter 130 transfers the encrypted user data to vendor server 150. Destination device 138 may then access and utilize the temporary key to decrypt the user data from vendor server 150 to thereby complete the data restore/migration procedure. The temporary key and user data may then be deleted from the vendor server 150. The present invention thus provides an improved mechanism to support enhanced vendor services while still preserving a high level of security for confidential user data. Further details regarding the implementation and utilization of the FIG. 1 data restore/migration system 114 are discussed below in conjunction with FIG. 9.

Figure 2:
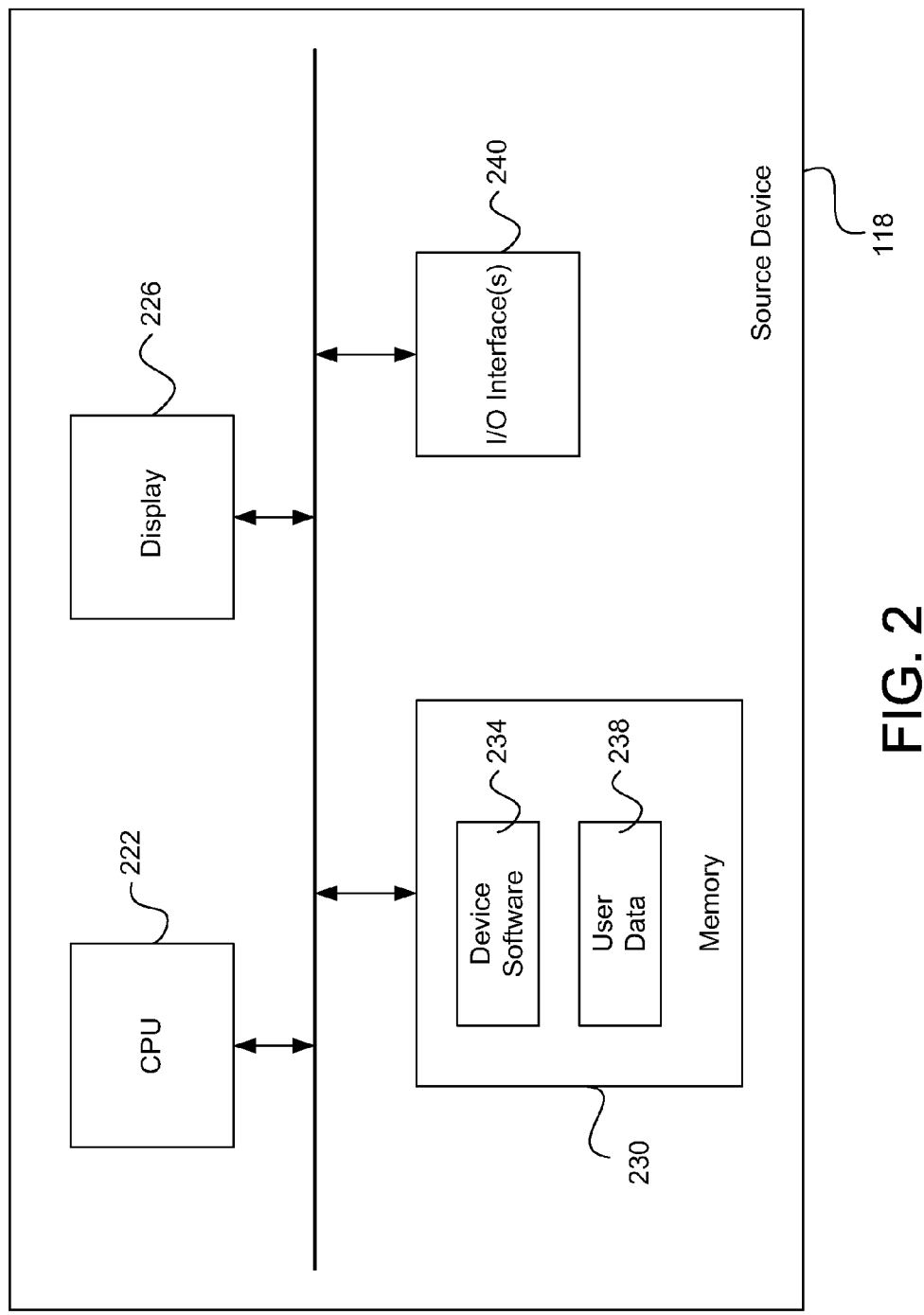
FIG. 2 is a block diagram for one embodiment of the source device of FIG. 1, in accordance with the present invention.

Referring now to FIG. 2, a block diagram for one embodiment of the FIG. 1 source device 118 is shown, in accordance with the present invention. In the FIG. 2 embodiment, source device 118 includes, but is not limited to, a central processing unit (CPU) 222, a display 226, a memory 230, and one or more input/output interface(s) (I/O interface(s)) 240. In alternate embodiments, source device 118 may alternately be implemented using components and configurations in addition to, or instead of, certain of those components and configurations discussed in conjunction with the FIG. 2 embodiment.

In the FIG. 2 embodiment, CPU 222 may be implemented to include any appropriate and compatible microprocessor device that preferably executes software instructions to thereby control and manage the operation of source device 118. The FIG. 2 display 226 may include any effective type of display technology including a cathode-ray-tube monitor or a liquid-crystal display device with an appropriate screen for displaying various information to a user. In the FIG. 2 embodiment, I/O interface(s) 240 may include one or more input and/or output interfaces to receive and/or transmit any required types of information by source device 118.

In the FIG. 2 embodiment, memory 230 may be implemented to include any combination of desired storage devices, including, but not limited to, read-only memory (ROM), random-access memory (RAM), and various types of non-volatile memory, such as floppy disks, memory sticks, compact disks, or hard disks. In the FIG. 2 embodiment, device software 234 may include program instructions that are preferably executed by CPU 222 to perform various functions and operations for source device 118. The particular nature and functionality of device software 234 typically varies depending upon factors such as the specific type and particular functionality of the corresponding source device 118.

In the FIG. 2 embodiment, user data 238 may include any desired type of electronic information that is stored in memory 230. For example, user data 238 may include, but is not limited to, text data, graphics data, video data, audio data, software programs, databases, and Internet information. In various embodiments, source device 118 may be implemented as any appropriate type of electronic device including, but not limited to, a portable or stationary computer device, a consumer electronics device, a digital camera, a cellular telephone, a personal digital assistant, or a television settop box. The implementation and utilization of source device 118 is further discussed below in conjunction with FIG. 9.

Figure 3:
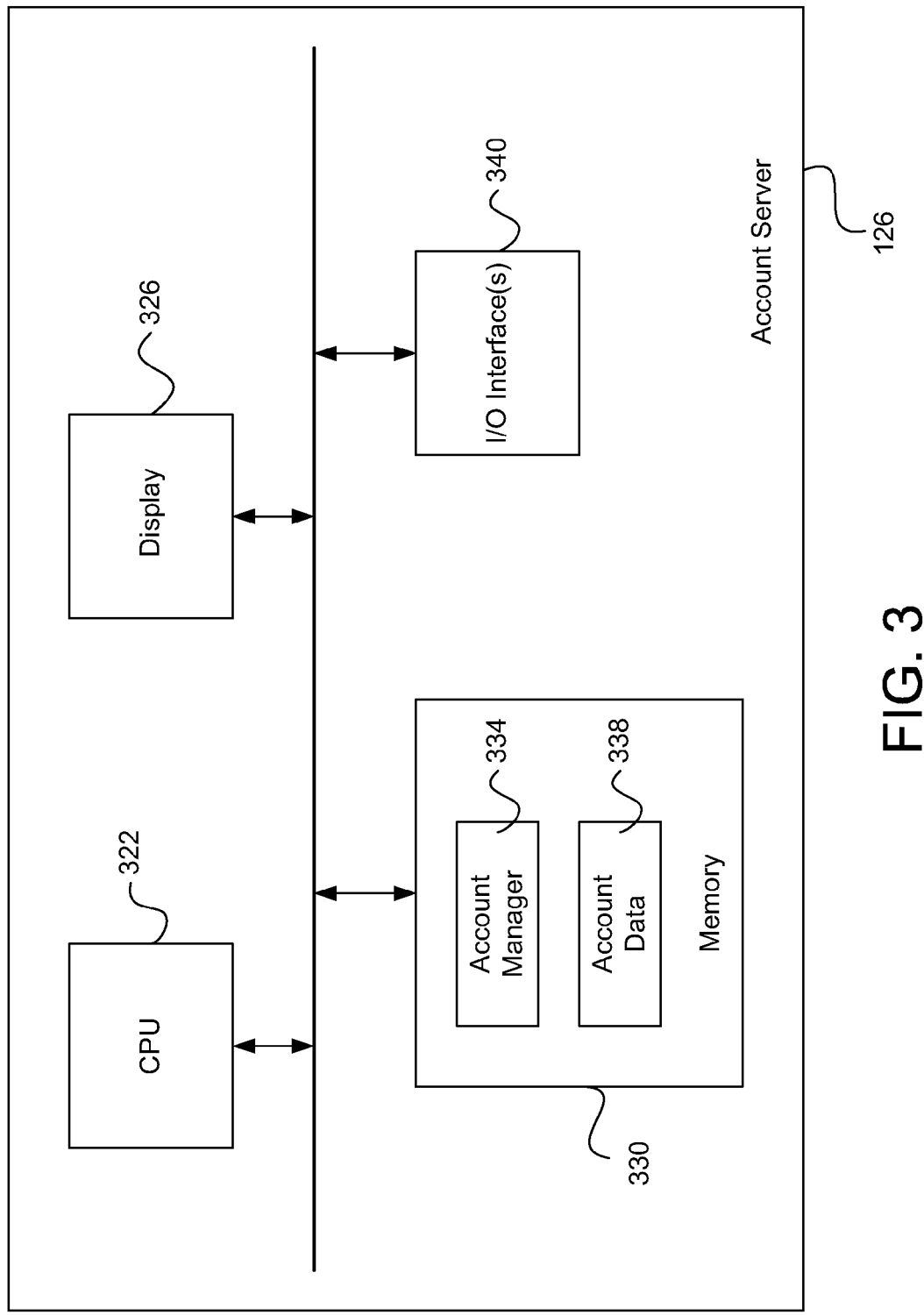
FIG. 3 is a block diagram for one embodiment of the account server of FIG. 1, in accordance with the present invention.

Referring now to FIG. 3, a block diagram for one embodiment of the FIG. 1 account server 126 is shown, in accordance with the present invention. In the FIG. 3 embodiment, account server 126 includes, but is not limited to, a central processing unit (CPU) 322, a display 326, a memory 330, and one or more input/output interface(s) (I/O interface(s)) 340. In alternate embodiments, account server 126 may alternately be implemented using components and configurations in addition to, or instead of, certain of those components and configurations discussed in conjunction with the FIG. 3 embodiment.

In the FIG. 3 embodiment, CPU 322 may be implemented to include any appropriate and compatible microprocessor device that preferably executes software instructions to thereby control and manage the operation of account server 126. The FIG. 3 display 326 may include any effective type of display technology including a cathode-ray-tube monitor or a liquid-crystal display device with an appropriate screen for displaying various information to a user. In the FIG. 3 embodiment, I/O interface(s) 340 may include one or more input and/or output interfaces to receive and/or transmit any required types of information by account server 126.

In the FIG. 3 embodiment, memory 330 may be implemented to include any combination of desired storage devices, including, but not limited to, read-only memory (ROM), random-access memory (RAM), and various types of non-volatile memory, such as floppy disks, memory sticks, compact disks, or hard disks. In the FIG. 3 embodiment, account manager 334 may include program instructions that are preferably executed by CPU 322 to perform various functions and operations for account server 126. For example, account manager 334 may coordinate a registration procedure for source device 118 to participate in a data backup service, as discussed above in conjunction with FIG. 1. In the FIG. 3 embodiment, account data 338 may include any desired type of electronic information that is related to one or more source devices 118 and corresponding data backup services. The implementation and utilization of account server 126 is further discussed below in conjunction with FIG. 9.

Figure 4:
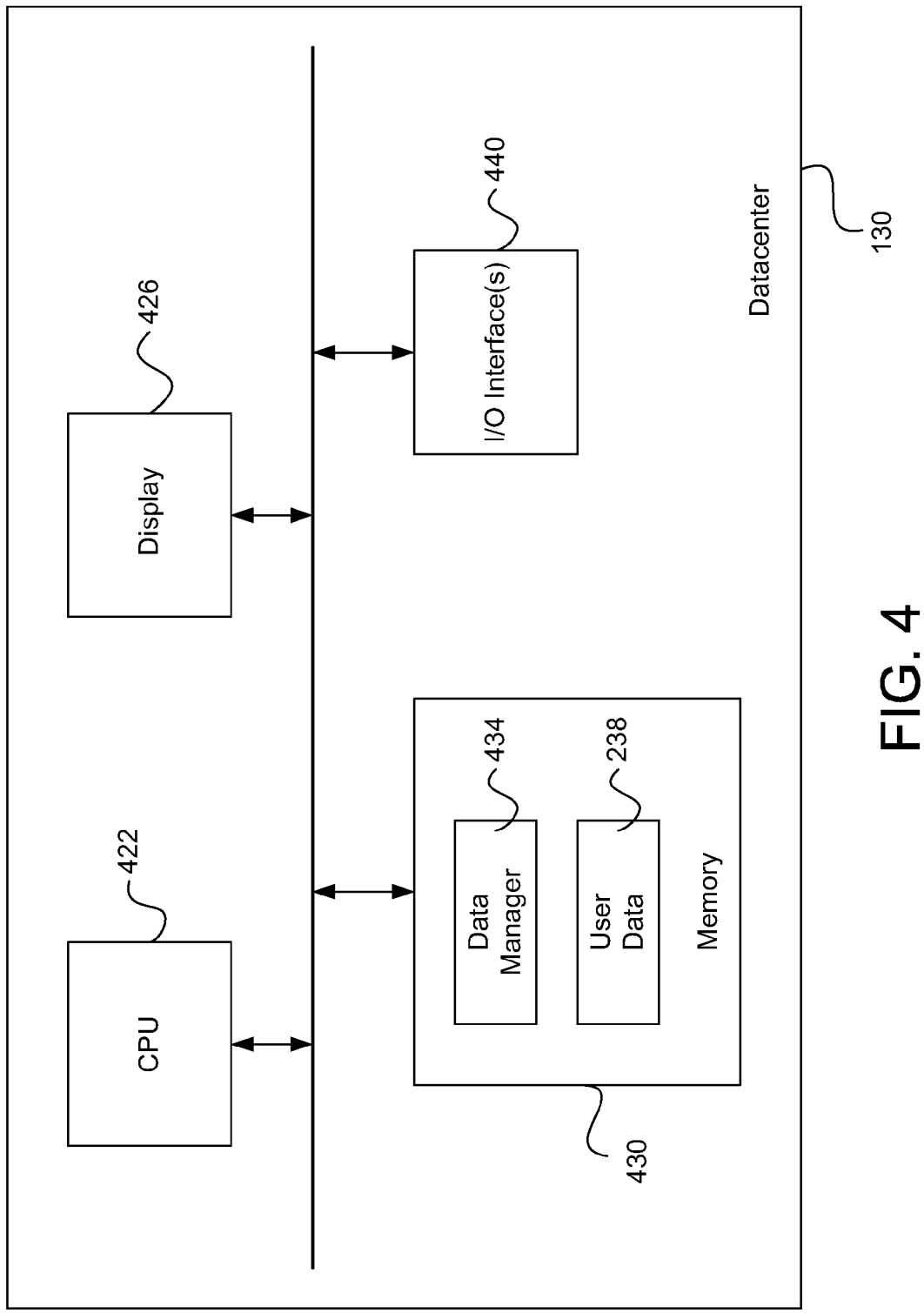
FIG. 4 is a block diagram for one embodiment of the datacenter of FIG. 1, in accordance with the present invention.

Referring now to FIG. 4, a block diagram for one embodiment of the FIG. 1 datacenter 130 is shown, in accordance with the present invention. In the FIG. 4 embodiment, datacenter 130 includes, but is not limited to, a central processing unit (CPU) 422, a display 426, a memory 430, and one or more input/output interface(s) (I/O interface(s)) 440. In alternate embodiments, datacenter 130 may alternately be implemented using components and configurations in addition to, or instead of, certain of those components and configurations discussed in conjunction with the FIG. 4 embodiment.

In the FIG. 4 embodiment, CPU 422 may be implemented to include any appropriate and compatible microprocessor device that preferably executes software instructions to thereby control and manage the operation of datacenter 130. The FIG. 4 display 426 may include any effective type of display technology including a cathode-ray-tube monitor or a liquid-crystal display device with an appropriate screen for displaying various information to a user. In the FIG. 4 embodiment, I/O interface(s) 440 may include one or more input and/or output interfaces to receive and/or transmit any required types of information by datacenter 130.

In the FIG. 4 embodiment, memory 430 may be implemented to include any combination of desired storage devices, including, but not limited to, read-only memory (ROM), random-access memory (RAM), and various types of non-volatile memory, such as floppy disks, memory sticks, compact disks, or hard disks. In the FIG. 4 embodiment, data manager 434 may include program instructions that are preferably executed by CPU 422 to perform various functions and operations for datacenter 130. For example, data manager 434 may coordinate data backup procedures for storing encrypted user data 238 from source device 118, as discussed above in conjunction with FIG. 1. The implementation and utilization of datacenter 130 is further discussed below in conjunction with FIG. 9.

Figure 5:
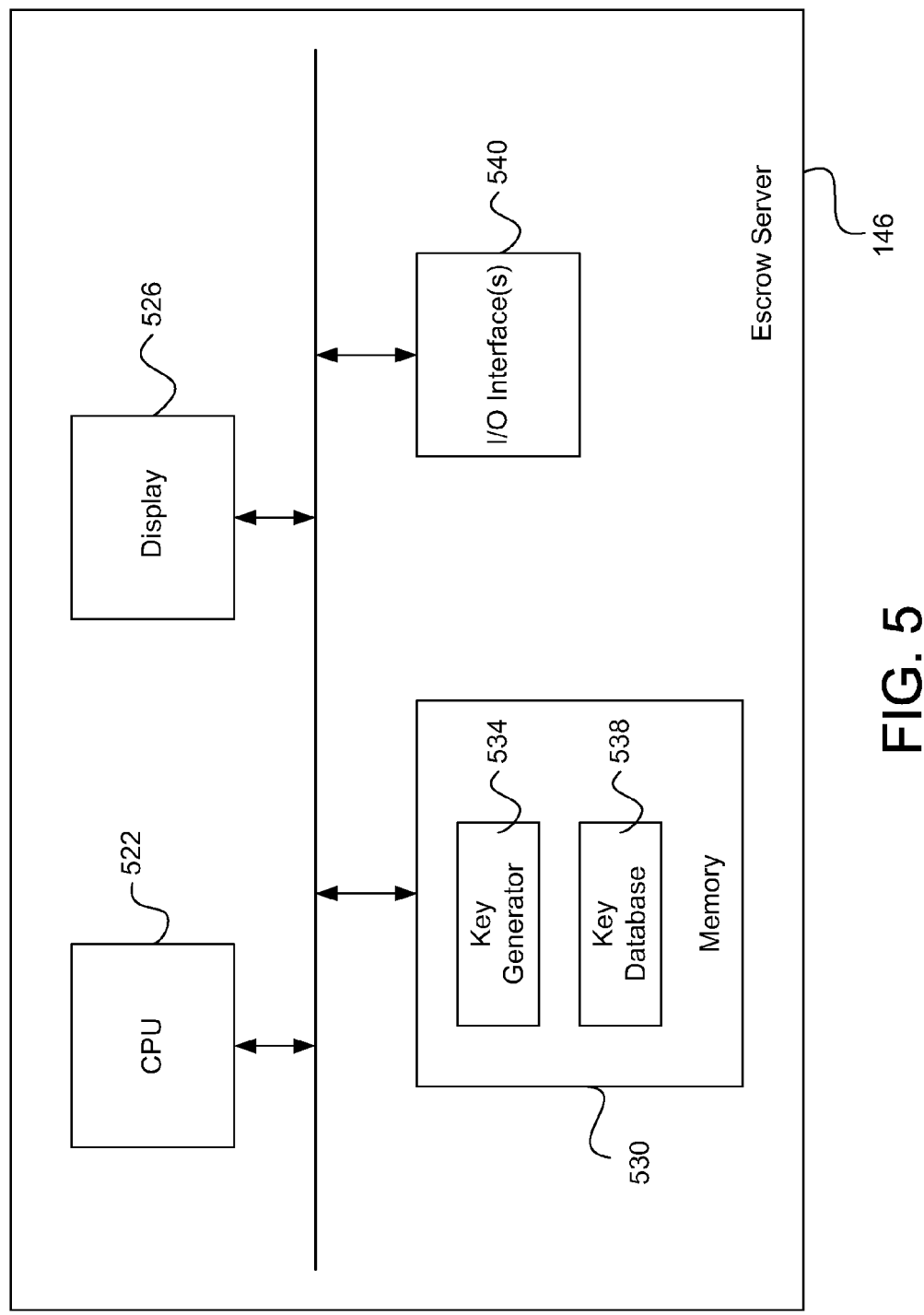
FIG. 5 is a block diagram for one embodiment of the escrow server from FIG. 1, in accordance with the present invention.

Referring now to FIG. 5, a block diagram for one embodiment of the FIG. 1 escrow server 146 is shown, in accordance with the present invention. In the FIG. 5 embodiment, escrow server 146 includes, but is not limited to, a central processing unit (CPU) 522, a display 526, a memory 530, and one or more input/output interface(s) (I/O interface(s)) 540. In alternate embodiments, escrow server 146 may alternately be implemented using components and configurations in addition to, or instead of, certain of those components and configurations discussed in conjunction with the FIG. 5 embodiment.

In the FIG. 5 embodiment, CPU 522 may be implemented to include any appropriate and compatible microprocessor device that preferably executes software instructions to thereby control and manage the operation of escrow server 146. The FIG. 5 display 526 may include any effective type of display technology including a cathode-ray-tube monitor or a liquid-crystal display device with an appropriate screen for displaying various information to a user. In the FIG. 5 embodiment, I/O interface(s) 540 may include one or more input and/or output interfaces to receive and/or transmit any required types of information by escrow server 146.

In the FIG. 5 embodiment, memory 530 may be implemented to include any combination of desired storage devices, including, but not limited to, read-only memory (ROM), random-access memory (RAM), and various types of non-volatile memory, such as floppy disks, memory sticks, compact disks, or hard disks. In the FIG. 5 embodiment, key manager 534 may include program instructions that are preferably executed by CPU 522 to perform various functions and operations for escrow server 146. For example, key manager 534 may generate and encrypt temporary keys for decoding encrypted user data, as discussed above in conjunction with FIG. 1. In the FIG. 5 embodiment, key database 538 may include any relevant information regarding the temporary keys generated by key manager 534. The implementation and utilization of escrow server 146 is further discussed below in conjunction with FIG. 9.

Figure 6:
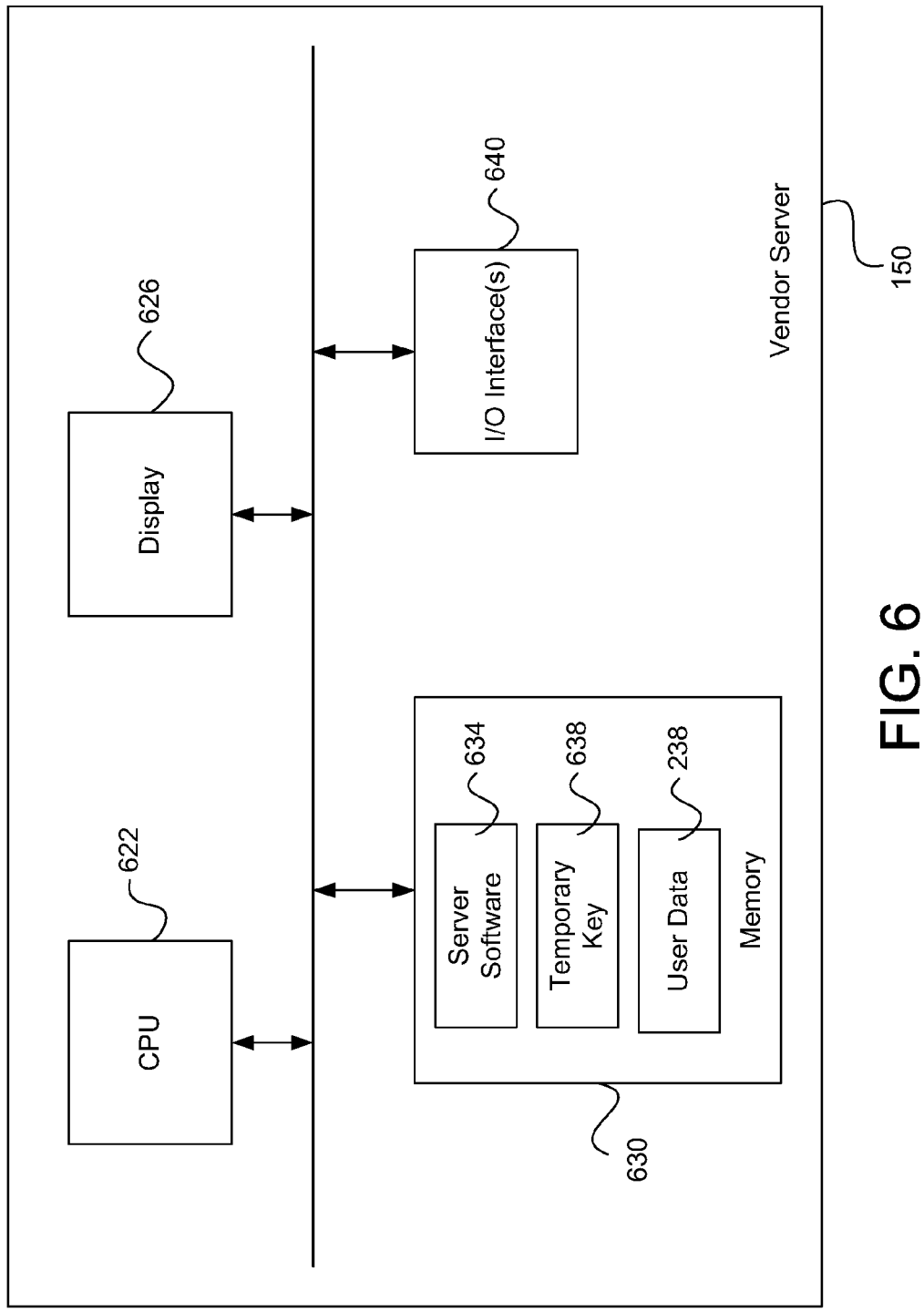
FIG. 6 is a block diagram for one embodiment of the vendor server of FIG. 1, in accordance with the present invention.

Referring now to FIG. 6, a block diagram for one embodiment of the FIG. 1 vendor server 150 is shown, in accordance with the present invention. In the FIG. 6 embodiment, vendor server 150 includes, but is not limited to, a central processing unit (CPU) 622, a display 626, a memory 630, and one or more input/output interface(s) (I/O interface(s)) 640. In alternate embodiments, vendor server 150 may alternately be implemented using components and configurations in addition to, or instead of, certain of those components and configurations discussed in conjunction with the FIG. 6 embodiment.

In the FIG. 6 embodiment, CPU 622 may be implemented to include any appropriate and compatible microprocessor device that preferably executes software instructions to thereby control and manage the operation of vendor server 150. The FIG. 6 display 626 may include any effective type of display technology including a cathode-ray-tube monitor or a liquid-crystal display device with an appropriate screen for displaying various information to a user. In the FIG. 6 embodiment, I/O interface(s) 640 may include one or more input and/or output interfaces to receive and/or transmit any required types of information by vendor server 150.

In the FIG. 6 embodiment, memory 630 may be implemented to include any combination of desired storage devices, including, but not limited to, read-only memory (ROM), random-access memory (RAM), and various types of non-volatile memory, such as floppy disks, memory sticks, compact disks, or hard disks. In the FIG. 6 embodiment, server software 634 may include program instructions that are preferably executed by CPU 622 to perform various functions and operations for vendor server 150. For example, server software 634 may receive a temporary key 638 from escrow server 146 for decoding encrypted user data 238 received from datacenter 130, as discussed above in conjunction with FIG. 1. The implementation and utilization of vendor server 150 is further discussed below in conjunction with FIG. 9.

Figure 7:
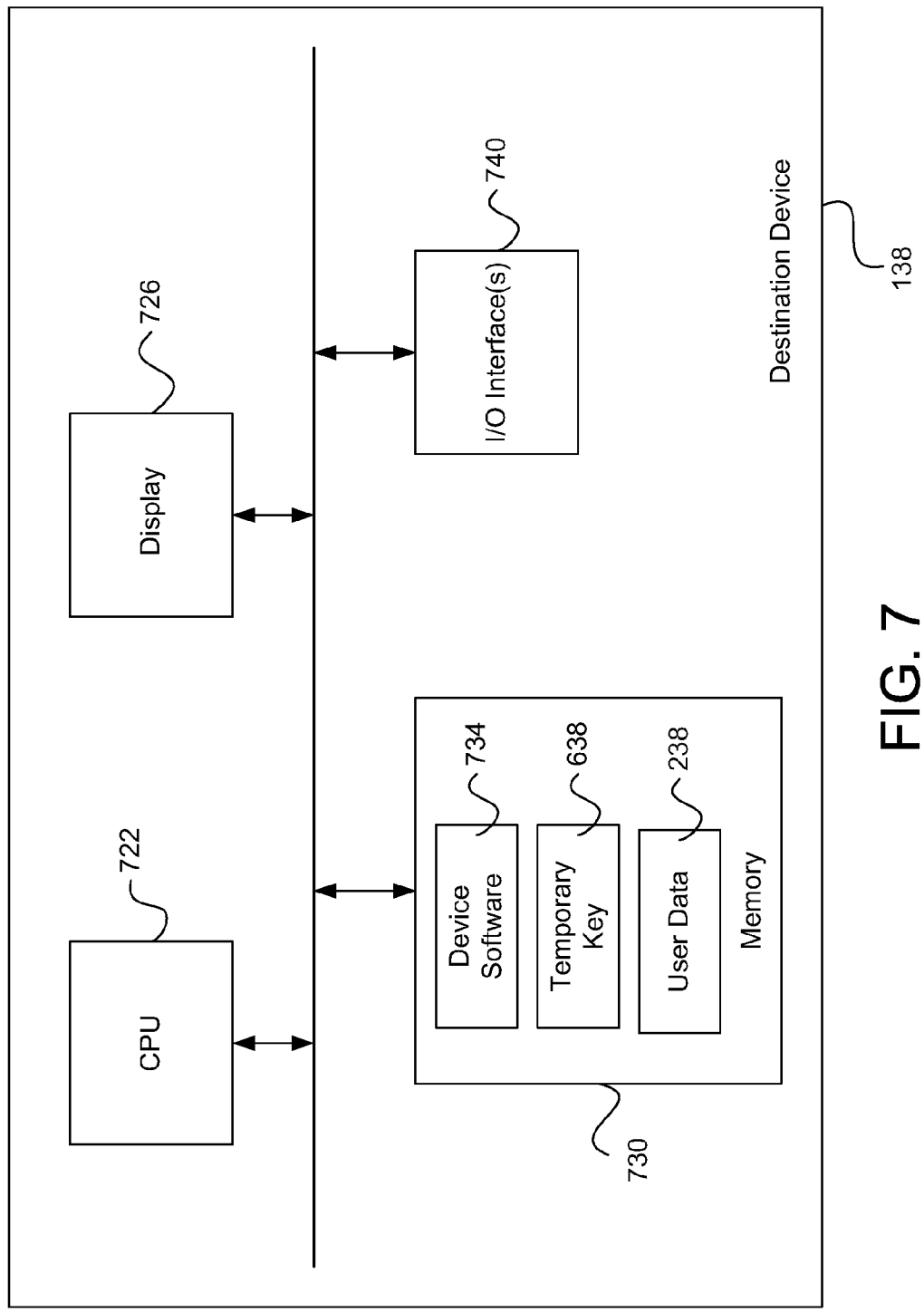
FIG. 7 is a block diagram for one embodiment of the destination device of FIG. 1, in accordance with the present invention.

Referring now to FIG. 7, a block diagram for one embodiment of the FIG. 1 destination device 138 is shown, in accordance with the present invention. In the FIG. 7 embodiment, destination device 138 includes, but is not limited to, a central processing unit (CPU) 722, a display 726, a memory 730, and one or more input/output interface(s) (I/O interface(s)) 740. In alternate embodiments, destination device 138 may alternately be implemented using components and configurations in addition to, or instead of, certain of those components and configurations discussed in conjunction with the FIG. 7 embodiment.

In the FIG. 7 embodiment, CPU 722 may be implemented to include any appropriate and compatible microprocessor device that preferably executes software instructions to thereby control and manage the operation of destination device 138. The FIG. 7 display 726 may include any effective type of display technology including a cathode-ray-tube monitor or a liquid-crystal display device with an appropriate screen for displaying various information to a user. In the FIG. 7 embodiment, I/O interface(s) 740 may include one or more input and/or output interfaces to receive and/or transmit any required types of information by destination device 138.

In the FIG. 7 embodiment, memory 730 may be implemented to include any combination of desired storage devices, including, but not limited to, read-only memory (ROM), random-access memory (RAM), and various types of non-volatile memory, such as floppy disks, memory sticks, compact disks, or hard disks. In the FIG. 7 embodiment, device software 734 may include program instructions that are preferably executed by CPU 722 to perform various functions and operations for destination device 138. The particular nature and functionality of device software 734 typically varies depending upon factors such as the specific type and particular functionality of the corresponding destination device 138.

In the FIG. 7 embodiment, user data 238 may include any desired type of electronic information that is decrypted using temporary key 638 and then stored in memory 730. In the FIG. 7 embodiment, temporary key 638 may be made temporary by utilizing any effective techniques. For example, temporary key 638 may be designed to be utilized only once before becoming inoperative. In certain embodiments, temporary key 638 is encrypted by escrow server 146, and destination device 138 must be authorized by escrow server 146 through a key authorization exchange (see FIG. 8) to utilize temporary key 638 for any decryption of user data 238. Escrow server 146 typically authorizes use of temporary key 638 only one time. In alternate embodiments, a decryption tool on destination device 138 may disable temporary key 638 after one decryption procedure.

In various embodiments, destination device 138 may be implemented as any appropriate type of electronic device including, but not limited to, a portable or stationary computer device, a consumer electronics device, a digital camera, a cellular telephone, a personal digital assistant, or a television settop box. The implementation and utilization of destination device 138 is further discussed below in conjunction with FIG. 9.

Figure 8:
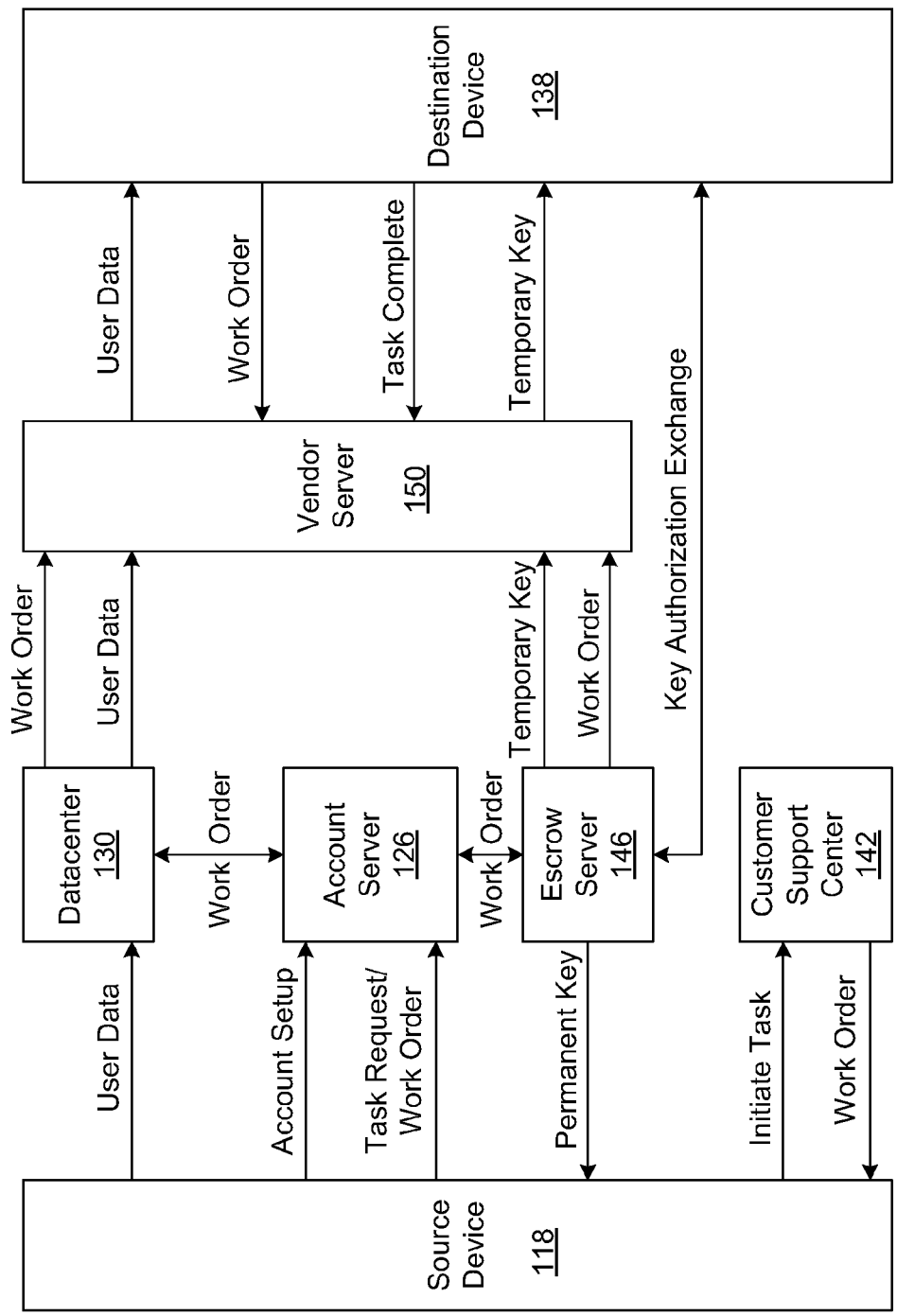
FIG. 8 is a signal flow diagram for one embodiment of a data restore/migration procedure, in accordance with the present invention.

Referring now to FIG. 8, a signal flow diagram for one embodiment of a data restore/migration procedure is shown, in accordance with the present invention. In the FIG. 8 embodiment, the various elements of FIG. 1 are shown with appropriate signal flow labels The FIG. 8 embodiment is presented for purposes of illustration, and in alternate embodiments, the present invention may utilize components, signals, and sequences, in addition to, or instead of, certain of those components, signals, and sequences shown in conjunction with the FIG. 8 embodiment. The FIG. 8 diagram may be best understood when viewed in conjunction with the following discussion of FIGS. 9A-9C.

Figure 9A:
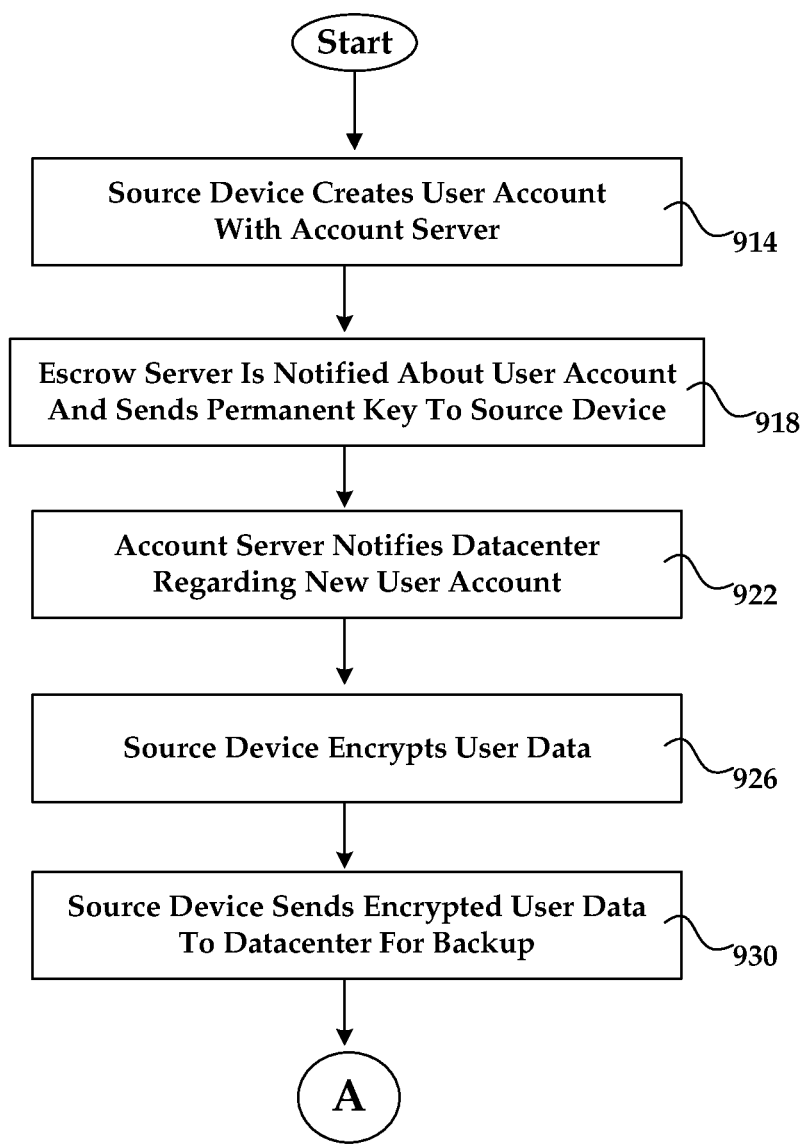
FIGS. 9A-C is a flowchart of method steps for performing a data restore/migration procedure, in accordance with one embodiment of the present invention.
Figure 9B:
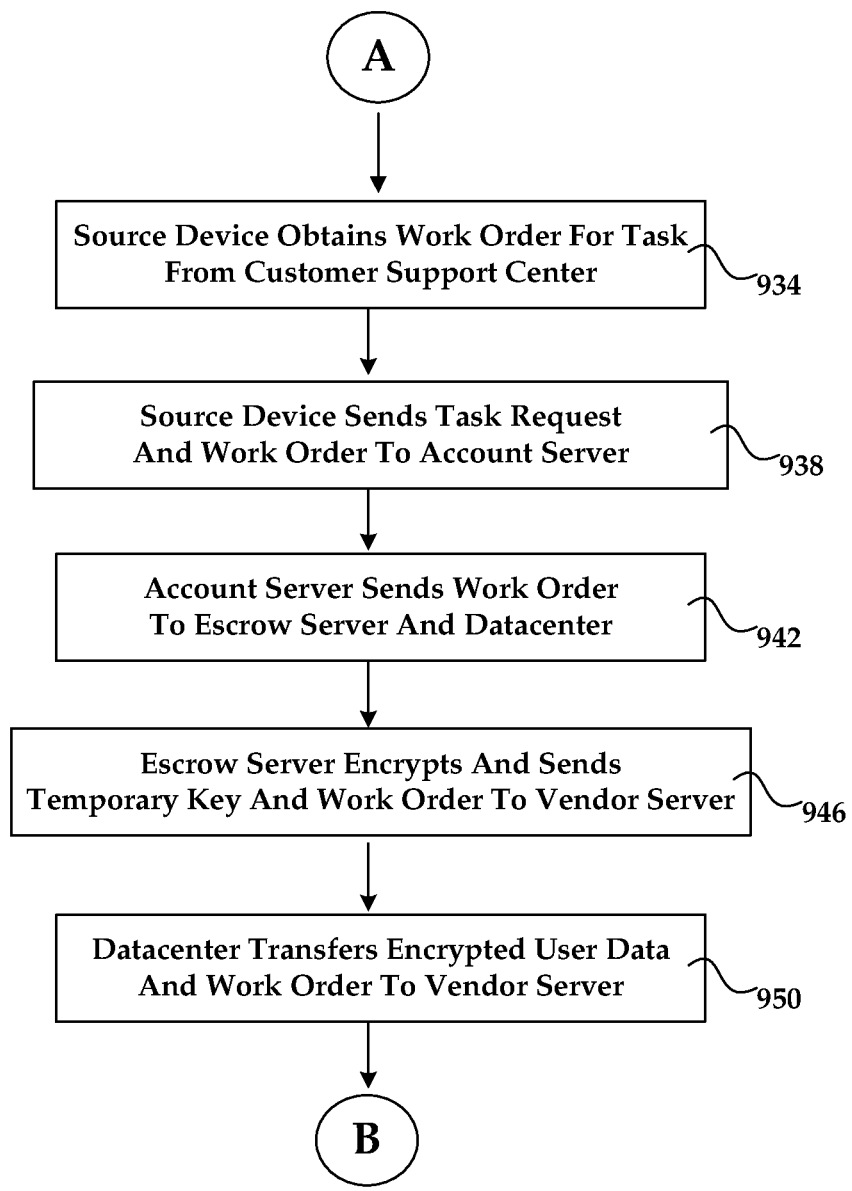
Figure 9C:
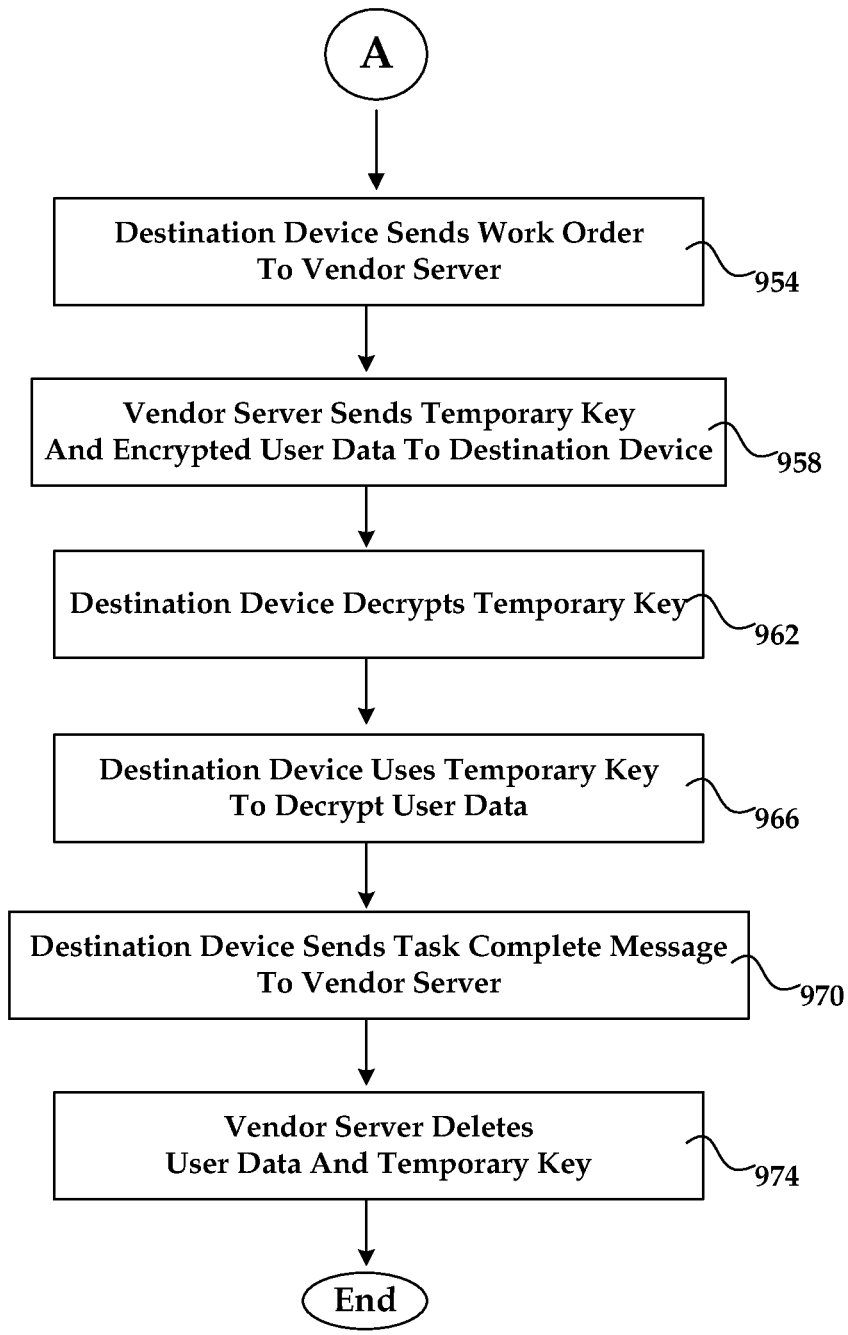

Referring now to FIGS. 9A-C, a flowchart of method steps for performing a data restore/migration procedure is shown, in accordance with one embodiment of the present invention. The FIG. 9 flowchart is presented for purposes of illustration, and in alternate embodiments, the present invention may utilize steps and sequences other than those steps and sequences discussed in conjunction with the FIG. 9 embodiment.

In step 914 of the FIG. 9A embodiment, a source device 118 initially creates a user account with an account server 126 to participate in a data backup service. In step 918, account server 126 notifies an escrow server 146 regarding the new user account of source device 118. In response, escrow server 146 sends a permanent key to source device 118 so that a device user of source device 118 can decrypt user data backups if so desired.

In step 922, account server 126 notifies a datacenter 130 regarding the new user account of source device 118. In step 930, source device 118 may then encrypt user data 238, and remotely store the encrypted user data 238 as a backup copy on datacenter 130. The FIG. 9A process then advances to step 934 of FIG. 9B through connecting letter "A."

In step 934, source device 118 may require a vendor 134 (FIG. 1) to perform a data restore/migration task. Source device 118 therefore contacts a customer support center 142 of vendor 134 to obtain a work order for performing the restore/migration task. In step 938, source device 118 sends a task request and the foregoing work order to the account server 126. In step 942, account server 126 responsively sends the received word order to escrow server 146 and datacenter 130.

In step 946, escrow server 146 encrypts a unique temporary key 638, and transmits the temporary key 638 and the received work order to a vendor server 946 of vendor 134. In step 950, the datacenter 130 transfers the received work order and encrypted user data 238 corresponding to source device 118 to vendor server 950. The FIG. 9B process then advances to step 954 of FIG. 9C through connecting letter "B."

In step 954, a destination device 138 sends a copy of the work order corresponding to the source device's data restore/migration task to vendor server 150. In step 958, the vendor server 150 responsively sends the temporary key 638 and encrypted user data 638 to the destination device 138. In step 962, destination device 138 decrypts the temporary key 962.

In step 966, destination device 138 then utilizes the temporary key 638 to decrypt the user data 238.

In step 970, the destination device 138 may then transmit a task-complete message to the vendor server 970. In step 974, the vendor server 150 may responsively delete the temporary key 638 and the user data 238 corresponding to the current data restore/migration procedure. The FIG. 9 process then terminates. For at least the foregoing reasons, the present invention therefore provides an improved system and method for effectively performing data restore/migration procedures.

The invention has been explained above with reference to certain embodiments. Other embodiments will be apparent to those skilled in the art in light of this disclosure. For example, the present invention may readily be implemented using certain configurations and techniques other than those described in the specific embodiments above. Additionally, the present invention may effectively be used in conjunction with systems other than those described above. Therefore, these and other variations upon the discussed embodiments are intended to be covered by the present invention, which is limited only by the appended claims.

What is claimed is:

1. A system for supporting data transfer procedures, comprising:
    a source device that encrypts and stores user data onto a datacenter, said source device registering for a data backup service with an account server,
    said source device initiating one of said data transfer procedures by requesting a data transfer task from a vendor, said datacenter responsively transferring said user data to a vendor server;
    an escrow server that generates and sends a temporary key to said vendor server, a customer service center issuing a work order corresponding to said data transfer task to said source device, said source device sending a task request and said work order to said account server, said account server sending said work order to said escrow server and said datacenter; and
    a destination device that utilizes said temporary key to decrypt said user data, said vendor server and said escrow server being implemented as discrete entities that are each separate from said source device and said destination device.

2. The system of claim 1 wherein said user data includes confidential information that is protected during said data transfer procedures.

3. The system of claim 1 wherein said source device requests said data transfer task from a customer service center of said vendor.

4. The system of claim 3 wherein said escrow server encrypts said temporary key, said escrow server then sending said temporary key and said work order to said vendor server.

5. The system of claim 4 wherein said datacenter sends said work order and said user data to said vendor server.

6. The system of claim 5 wherein said destination device obtains and sends said work order to said vendor server.

7. The system of claim 6 wherein said destination device decrypts said temporary key.

8. The system of claim 3 wherein said customer support center and said vendor server are controlled and operated by said vendor, said account server and said datacenter being controlled and operated by a separate backup service, said escrow server being controlled and operated by a separate escrow service.

9. The system of claim 1 wherein said data transfer procedures include a data migration procedure during which said vendor migrates said user data from said source device to said destination device, said destination device then replacing said source device.

10. The system of claim 1 wherein said data transfer procedures include a data restore procedure during which said vendor restores said user data from said source device to said destination device, said destination device being said source device after one or more servicing procedures have been performed.

11. The system of claim 1 wherein said escrow server provides a permanent key to said source device.

12. The system of claim 11 wherein said account server notifies said datacenter about said source device registering for said data backup service.

13. The system of claim 1 wherein said destination device sends a task-complete message to said vendor server after decrypting said user data with said temporary key, said vendor server responsively deleting said temporary key and said user data.

14. The system of claim 1 wherein said temporary key is required to be utilized only once before becoming inoperative, said destination device requiring an authorization from said escrow server through a key authorization exchange to utilize said temporary key.

15. The system of claim 1 wherein said temporary key is required to be utilized only once before becoming inoperative, a decryption tool on said destination device disabling said temporary key after one decryption procedure.

16. A method for supporting data transfer procedures, comprising:
    utilizing a source device to encrypt and store user data onto a datacenter, said source device registering for a data backup service with an account server;
    initiating one of said data transfer procedures by requesting a data transfer task from a vendor;
    transferring said user data from said datacenter to a vendor server;
    generating and sending a temporary key to said vendor server with an escrow server, a customer service center issuing a work order corresponding to said data transfer task to said source device, said source device sending a task request and said work order to said account server, said account server sending said work order to said escrow server and said datacenter; and
    decrypting and storing said user data onto a destination device by utilizing said temporary key, said vendor server and said escrow server being implemented as discrete entities that are each separate from said source device and said destination device, said source device and said destination device being implemented as mobile electronic devices.

* * * * *